United States Patent [19]

Chong

[11] 4,192,637
[45] Mar. 11, 1980

[54] INTEGRATED SYSTEM FOR FORMING SHEETS AND FILMS OF SYNTHETIC RESINS

[75] Inventor: Antonio T. Chong, Taipei, Taiwan

[73] Assignee: USI Far East Corporation, Taipei, Taiwan

[21] Appl. No.: 869,746

[22] Filed: Jan. 16, 1978

[51] Int. Cl.$^2$ .................................................. B29D 23/04
[52] U.S. Cl. .................. 425/140; 425/326.1; 425/380; 425/467; 425/812
[58] Field of Search .................... 264/95, 209, 328; 425/377, 153, 140, 141, 72 R, 326.1, 376 A, 404, 445, 380, 467, 812

[56] References Cited

U.S. PATENT DOCUMENTS

| | | | |
|---|---|---|---|
| 3,170,011 | 2/1965 | Cheney et al. | 425/140 X |
| 3,353,209 | 11/1967 | Schad | 264/328 X |
| 3,579,728 | 5/1971 | Reid et al. | 425/377 X |
| 3,821,339 | 6/1974 | Johnson | 425/141 X |
| 3,902,832 | 9/1975 | Gregory et al. | 425/326.1 X |
| 4,080,143 | 3/1978 | Upmeier | 425/72 R X |

Primary Examiner—Mark Rosenbaum
Attorney, Agent, or Firm—Kenneth D. Tremain

[57] ABSTRACT

Integrated system for the extrusion of an end product from thermoplastic synthetic polymers taken directly from a polymerization reactor. The polymers withdrawn from the reactor are extruded through a die orifice to provide a tube which is inflated by a gas, usually air, introduced therein. Gaseous monomer contained in the polymers and evaporatingly released from the interior wall of the tube becomes intermixed with the inflating gas, and is withdrawn intermittently or continuously in response to measured changes in the diameter of the tube. Evacuation of monomer-containing gas prevents accumulation of the monomer to potentially explosive levels. The rates at which gas is introduced into or withdrawn from the tube are regulated to maintain changes in the lay-flat width of tube within acceptable limits in response to the tube width being sensed by a sensing arrangement.

7 Claims, 6 Drawing Figures

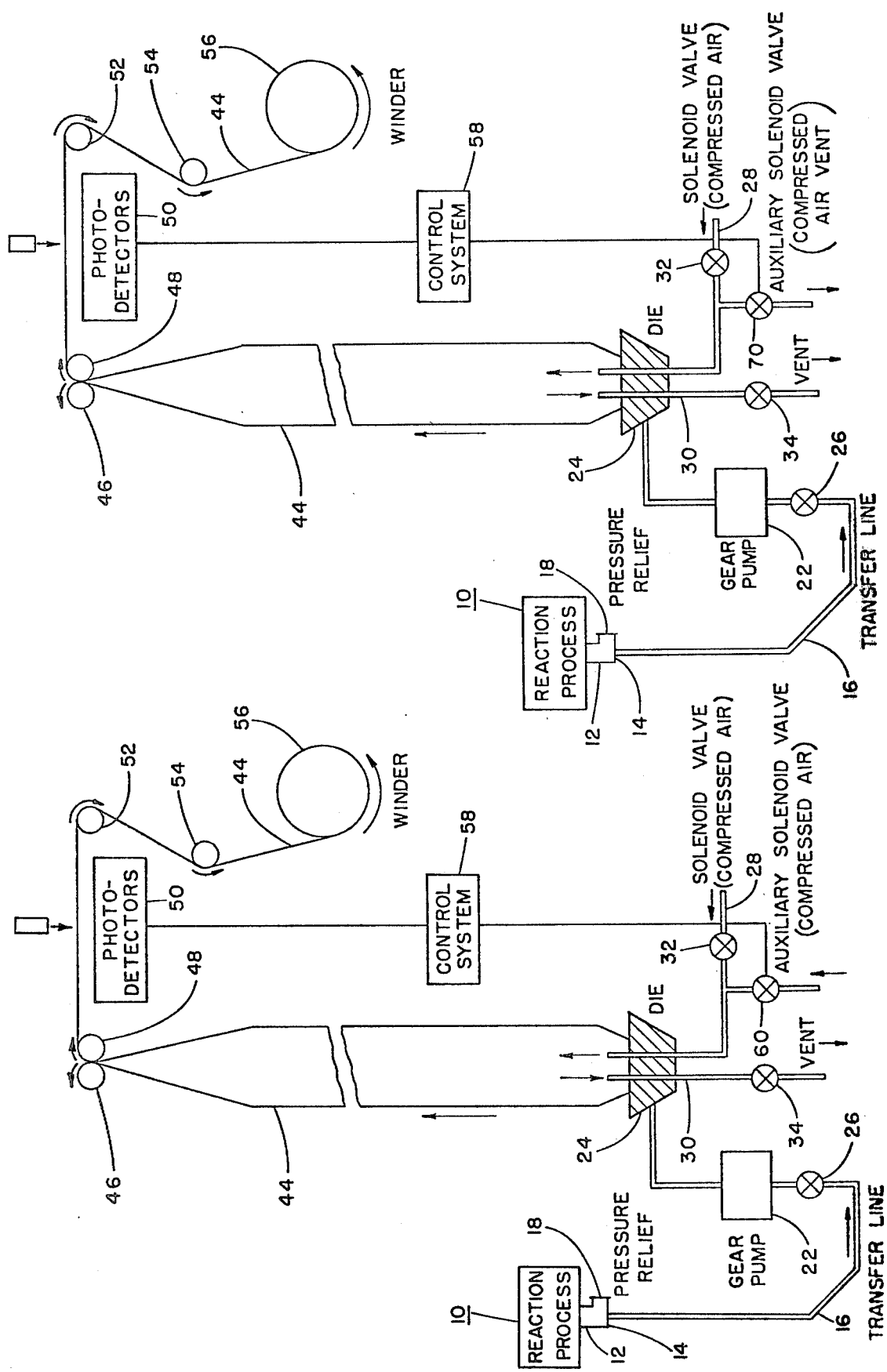

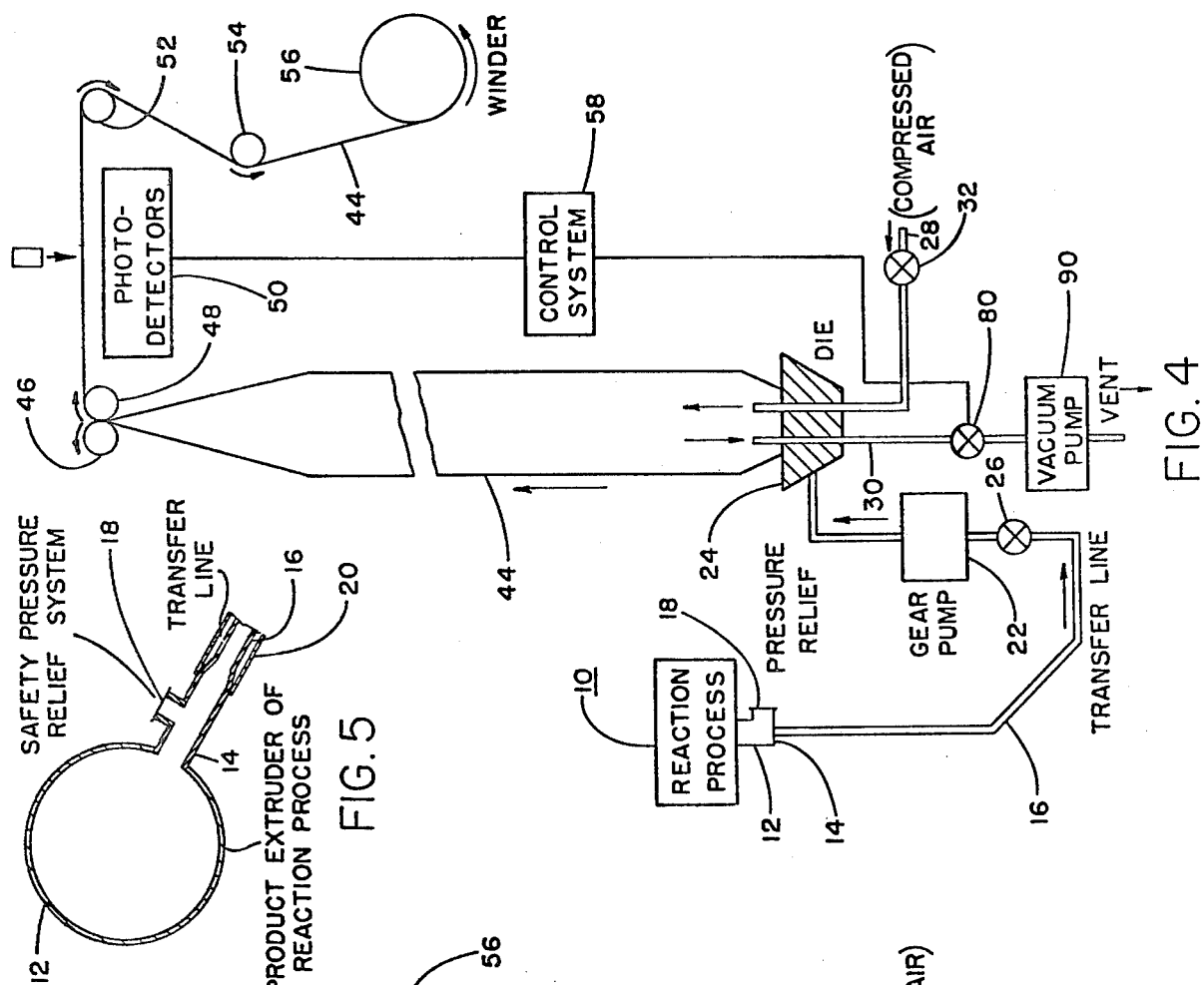
FIG. 4
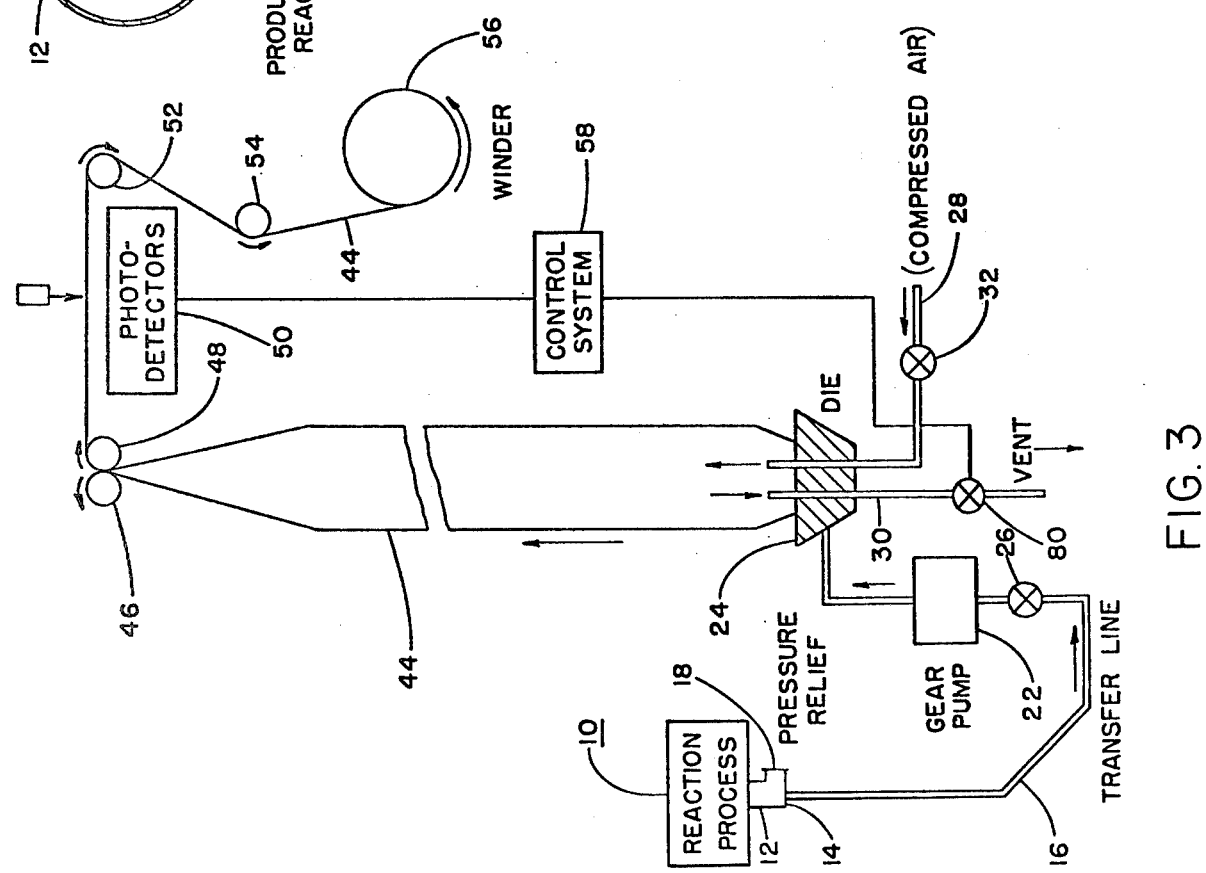
FIG. 5
FIG. 3

INTEGRATED SYSTEM FOR FORMING SHEETS AND FILMS OF SYNTHETIC RESINS

BACKGROUND OF THE INVENTION

1. Field of the Invention

The present invention relates, in general, to an integrated system for extruding a polymer, drawn directly from a polymerization reactor, and formed into an end product.

2. Description of the Prior Art

In currently known processes for extruding synthetic polymer or resin sheets and film, pelleted resin produced by any one of several conventional polymerization processes and containing little or no dissolved monomer therein is heated to a molten state. The resin is then extruded through a die to provide a tube which is inflated from one end thereof by air introduced into the tube at the die orifice. Inflation of the tube, accompanied by stretching of the tube in an axial or longitudinal direction, biaxially orients the resin molecules so as to maximize the mechanical properties of the resulting film. The opposite or leading end of the inflated tube is then passed into the nip of a pair of cooperating rotatable rollers to provide a flat film. Although this process is widely employed in the manufacture of polyethylene, polypropylene and ethylene vinyl acetate films, as well as films of other thermoplastic resins, the process is subject to several drawbacks and limitations.

Thus, each of the operations required in the preparation of pelleted resin, i.e., extruding molten resin taken from a polymerization unit to form cylindrical strands, passing the strands through a cooling medium such as water to solidify the resin, cutting the solidified strands into segments of equal length to provide pellets, and thereafter drying the pellets, interposes additional energy-consuming steps in the manufacture of the final product.

SUMMARY OF THE INVENTION

In accordance with one aspect of the present invention, an integrated system is provided by means of which an end product is extruded from a polymer which is obtained directly from a polymerization reactor. An integrated system of this nature eliminates many intermediate, energy consuming and costly middle operations normally required in a typical prior art arrangement wherein the output of the polymerization reactor is depressurized, cooled, and then formed into pellets constituting an intermediate product which are subsequently reheated and again pressurized prior to being extruded into an end product.

Pursuant to one embodiment of the present invention, polymer is withdrawn directly from a polymerization reactor and, in its molten state, is then conducted into an extruder which includes a die for extruding the molten polymer into a polymeric end product.

In accordance with another aspect of the present invention, a safety pressure release system is provided at the output of the polymerization reactor so as to ensure that no rupture of any component of the integrated system will occur in the event that the pressure of the molten polymer conveyed from the reactor exceeds a predetermined value. Preferably, in the disclosed embodiment of the invention, the molten polymer is withdrawn from the reactor at the product extruder of the former. Moreover, the transfer conduit for conveying the molten polymer from the polymerization reactor to the extruder is heated, preferably by a steam jacket, in order to maintain the molten state polymer within a predetermined temperature range.

In accordance with another aspect of this invention, the extruder includes a film blowing die for forming a tubular polymeric product which is subsequently flattened into a sheet or flattened tubular film by being passed between a pair of cooperating rotatable rollers. This particular arrangement frequently poses problems since the extruded polymer contains dissolved monomer which is released into the interior of the tube. Problems of this nature are generally not encountered in the prior art in which the starting material for the extruder is an intermediate product from which dissolved monomer has been evaporated prior to its introduction into the extruder. Dissolved monomer released from the external surface of the tubular product normally is evaporated into the surrounding atmosphere and dissipates harmlessly. However, monomer released interiorly of the tubular product has the potential of accumulating therein and to thereby form into explosive concentrations.

In order to prevent a potentially dangerous monomer buildup of this nature within the tubular product, a ventilation system is provided in order to vent the interior of the tubular product, thereby preventing an accumulation therein of undue concentrations of monomer. The ventilation system includes the provision of a gas inlet leading into the tube for the introduction thereinto of a fresh gas, for example such as air, and a gas outlet to vent monomer-enriched gas therefrom. A sensing or detection arrangement is incorporated to constantly provide indication of the diameter of the resultant tubular product, and with the ventilation system being controlled in conformance with the output of the detection arrangement to maintain the diameter within predetermined upper and lower limits.

In accordance with one disclosed embodiment of the invention, the gas outlet of the ventilation system is continually open during operation of the system, and the quantity of gas entering the formed tubular product through the gas inlet is controlled in response to the width of the tubular product being sensed so as to maintain the dimensions of the tube diameter within a desired range. The gas inlet includes first and second inlet passageways, both of which allow for the inlet of compressed gas, such as compressed air, into the tubular product. The inlet first passageway is open during operation of the system, while the second passageway has a control valve therein which is regulated so as to control the amount of gas flowing therethrough into the gas inlet. Pursuant to a modification of this embodiment, the second inlet passageway functions as a vent for a portion of the gas supplied through the first inlet passageway, and a valve is positioned in the former and controlled to selectively vent gas from the first passageway thereby regulating the quantity of gas conducted through the gas inlet into the tubular product.

In accordance with another embodiment of the invention, the gas inlet is continually open during operation of the system, and a control valve arranged in the gas outlet and responsive to the width of the tubular product being sensed regulates the quantity of gas flowing from the tubular product. Further, in a modification of this system, a vacuum pump is coupled to the gas outlet in order to assist in the enhanced venting of monomer-enriched gas from the tubular product.

Accordingly, it is a primary object of the present invention to provide an integrated system for extruding an end product from a polymer obtained directly from a polymerization reactor, and in which an integrated system of this type eliminates many costly and energy consuming operational steps involved in known prior art systems which process the polymer from the reactor into an intermediate product so as to be later extruded into an end product.

It is a further object of the present invention to provide a system of this nature which eliminates problems encountered due to the nature of the extruded polymer, such as the release of dissolved monomer therefrom as it is extruded, which could present a potential explosion hazard.

Another more specific object of the present invention lies in the provision of an integrated extrusion system of the type described including an arrangement for regulating the diameter of the extruded tubular product by controlling the flow of a pressurized gas therein in response to sensing the width of the tubular product.

Yet another object of the present invention lies in the provision of an integrated extrusion system of the type described incorporating a safety arrangement for venting the system upon the occurrence of excessive pressures therein.

BRIEF DESCRIPTION OF THE DRAWINGS

The foregoing and other objects and advantages of the integrated system constructed pursuant to the teachings of the present invention may now be more readily understood by one skilled in the art, having reference to the following detailed description of several preferred embodiments thereof, taken in conjunction with the accompanying drawings; in which:

FIG. 1 schematically illustrates an integrated system for forming an extruded tubular product from polymer which is obtained directly from a polymerization reactor;

FIG. 2 illustrates a system similar to that shown in FIG. 1 but incorporating a modification of the ventilation system employed in forming the tubular product;

FIG. 3 is a schematic representation of a further embodiment of the present invention employing still another type of ventilation system;

FIG. 4 illustrates a modification of the embodiment shown in FIG. 3 in which a vacuum pump is added at the gas outlet to assist in evacuating gas contained within the tubular product;

FIG. 5 is a detailed sectional view showing an arrangement for withdrawing polymer from a preferred location in the polymerization reactor through a conduit having a pressure safety device incorporated therein.

DETAILED DESCRIPTION OF THE DRAWINGS

Figure 6:
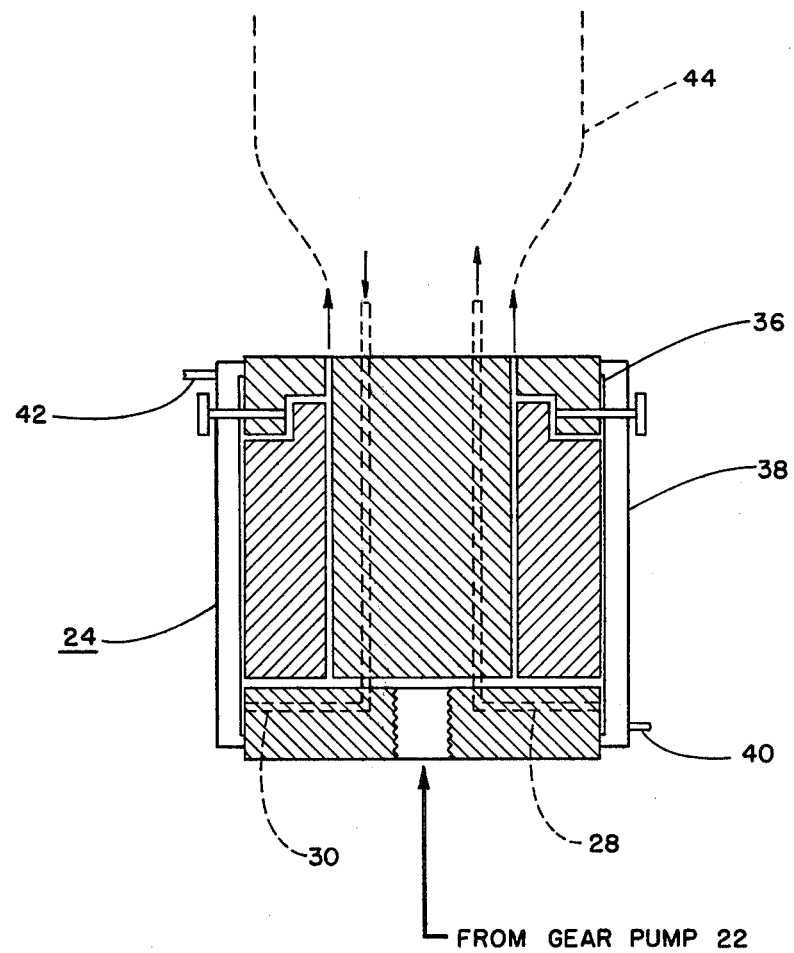
FIG. 6 is a generally diagrammatic sectional view of an extrusion die which may be used in the extrusion systems of the present invention.

Referring now in detail to the drawings, FIG. 1 generally schematically illustrates a polymerization reactor 10 from which molten polymer may be withdrawn from the reaction process at an adequately high temperature and pressure. The reactor may be one of several known types for the production of various polymers, such as polyethylene, polypropylene and copolymers of ethylene and vinyl acetate containing from 5 to 20 percent by weight of vinyl acetate. Conventional reactors for these polymers generally consist of a polymerization reactor, a cooler, a high pressure separator, a low pressure separator, and a product extruder which forms an intermediate product. By way of example, the disclosed embodiment is described in connection with a polymerization reactor for the production of polyethylene.

The molten polymer can be withdrawn at any point from the reactor 10 which provides polymer at a sufficiently high temperature and pressure to maintain it in a molten state. A preferred region for withdrawing molten polymer extends from the outlet of the high-pressure separator to the outlet of the product extruder, with a preferred location being the outlet of the product extruder.

Referring to FIGS. 1 and 5, a product extruder 12 has an intermediate coupling 14 attached thereto which communicates with a transfer line 16. A safety pressure release arrangement 18, in the form of a rupturable disc or plate valve is connected in coupling 14 in order to prevent the transfer line 16 from rupturing in the event that the pressure of the molten polymer accidentally exceeds a predetermined upper limit. The transfer line 16 has a steam jacket 20 extending therearound designed to maintain the temperature of the polymer within a predetermined temperature range, for example, a temperature range of 140° to 190° C. for polyethylene. The pressure of the transfer line is normally from about 100 to 400 psig. The transfer line 16 itself may have a two-inch internal diameter, and conducts the molten polymer from the reactor 10 to the remaining apparatus, the latter of which includes an extruder in the form of a gear pump 22 and an extrusion die 24. A control valve 26 is placed in the transfer line 16 upstream of the gear pump extruder 22, and is used for conventional process purposes. The exterior of the gear pump 22 may also be steam jacketed or heated in a suitable manner so as to maintain the molten polymer within its preferred temperature range.

In the illustrated embodiment, the die 24 is a conventional type of film blowing die which has been modified to incorporate a gas inlet conduit or passageway 28 and a gas outlet conduit or passageway 30. When conduits are employed, they may project from 2 to 12 inches from the inside of the die. In alternative embodiments, other types of dies, such as a T type or a profiled type, may be used to extrude the polymers. The gas inlet and outlet passageways 28 and 30 are, respectively, provided with flow control valves 32 and 34 for conventional process flow control purposes.

A suitable film blowing extrusion die 24 of conventional design is illustrated in FIG. 6 of the drawings, and may be provided with an encompassing electrical heating band 36 in order to maintain the molten polymer within the correct temperature range. For the reasons stated hereinabove, dangerous gases, such as ethylene or propylene, may come into contact with the heater, which would present a safety problem, from the standpoint of fires or explosions. In order to avoid a problem of this nature, a cylindrical cover 38 is provided to surround the die, and is supplied with a flow of compressed air through inlet 40, which continuously traverses the space present between the cover and the heater to thereby prevent contact between the potentially explosive gases and the heater, with the air then exiting through outlet 42. In operation, the illustrated die 24 produces a tubular film 44 constituted of a polymer in a manner which is conventional in the art.

Because the polymer is removed directly from the polymerization reactor it may have monomer gases dissolved therein which have not had an adequate opportunity to evaporate from the polymer. These monomer gases are potentially explosive, and those evaporating from the exterior surface material of the tubular product 44 are dissipated in the surrounding environment. However, those gases evaporating interiorly of the tubular product downstream of die 24 have a tendency to accumulate therein to potentially dangerous levels if the extrusion is effectuated through the intermediary of conventional prior art apparatus. In view of the foregoing problem, the present disclosed embodiment is provided with a novel ventilation system, including the respective gas inlet and outlet passageways 28 and 30 to provide a continuous inflow of fresh gas, for example, such as compressed air, into the tubular product and a continuous outflow of monomer-enriched or entrained gas from the tube.

The product tube 44 is flattened by being passed through the nip between a pair of conventionally cooperating rotatable rollers 46 and 48, is then conducted past a photodetection system 50 which senses the lay-flat width of the flattened product, and which is then directed by guide rollers 52 and 54 onto a conventional winder 56.

The photodetection system 50 may comprise photodetectors which are arranged along one or both edges of the flat sheet or film product 44 in order to detect fluctuations in its width. The electrical outputs of these photodetectors are conducted to a suitable control system 58 which controls the operation of the ventilation system in response to the sensed sheet of film width to thereby maintain the diameter of the tubular product within given defined limits.

In accordance with the embodiment illustrated in FIG. 1, inlet passageway 28 is coupled to a source of compressed air through valve 32 and also through an auxiliary solenoid-controlled valve 60. During operation of this embodiment, valves 32 and 34 are normally open in order to allow the flow of gases therethrough. The control system 58 responds to a detected narrow lay-flat width of the sheet to energize the auxiliary valve 60 to open the valve and to allow an additional amount of compressed air to flow into the bubble to increase its width. When the width of the bubble has reached a given value, the control system deactivates the auxiliary valve to stop the additional flow of air.

In the following embodiments of the invention, all elements similar to or identical with the elements described in connection with FIGS. 1 and 5 are identified by the same reference numerals.

FIG. 2 illustrates a modification of the embodiment shown in FIG. 1, wherein an auxiliary valve 70 operates in an opposite sense to that of valve 60 in the embodiment of FIG. 1. In this embodiment, valve 70 opens so as to allow pressurized inlet gas or air to be vented from gas inlet 28, rather than providing for an auxiliary flow of air to inlet passageway 28.

FIG. 3 illustrates a further embodiment of the invention wherein, during normal operation, gas inlet valve 32 is now continually open, and the control system 58 is responsive to the detected lay-flat width of the film 44 to selectively open and close a vent valve 80 for the gas outlet 30, with the valve 80 being closed for effecting an increase in the width of the tubular product and being opened to effect a decrease in the width thereof.

A modification of the embodiment of FIG. 3 is shown in that of FIG. 4, wherein a vacuum pump 90 is added to outlet passageway 30 in order to assist in the evacuation of gas from the tubular product 44 and vent valve 80, and to enhance the circulation of gas within the bubble or tubular product.

The ventilation system is adapted to reduce the monomer content of the gas in the tubular product to very low and acceptable levels. For example, when extruding polyehtylene and employing air as the tube or bubble inflating gas in the embodiment of FIG. 1, the ethylene content can be reduced well below 30,000 ppm (by weight) which is the allowable upper limit for avoiding an explosion of ethylene in air as shown below:

| Air Flow Rate in Liters per Minute | Ethylene in ppm |
|---|---|
| 3 | 1554 |
| 11 | 660 |
| 18 | 220 |
| 22.5 | 130 |

The monomer-removing apparatus herein can also reduce any fluctuations of the lay-flat width of the bubble to a very low value of ±2.5 mm without adversely effecting the thickness of the bubble wall.

Apparatus of the type heretofore described is employed to extrude a film grade polyethylene containing dissolved ethylene monomer. A flow of molten polyethylene at a temperature of 165° C. is withdrawn at a rate of 30 Kg/hour by a gear pump from the exit of a product extruder through a transfer line to a film-blowing die and then processed into a tubular film. The transfer line, the gear pump and the die are steam-jacketed so that the molten polymer therein is kept at a constant temperature of 165° C. The diameter of the die is 100 mm. A stream of compressed air is blown into the bubble of the tubular film so that the air-ethylene mixture is expelled through the air-expelling line at a rate of 18 liters/min. The properties of the film made in accordance with the direct and continuous process of this invention and film manufactured by a conventional process are compared in the following Table.

TABLE

|  | Test Method | Process of the Invention | Conventional Process |
|---|---|---|---|
| Width, tolerance mm ± mm | JIS-Z1702 | 400 ± 2.5 | 400 ± 1.0 |
| Thickness mm ± % | ASTM D-2103 | 0.039 ± 10.3<br>0.039 ± 25.6 | 0.040 ± 15.6<br>0.040 ± 17.6 |
| Dart Impact g/F50 | ASTM D-1709 | 80 | 78 |
| Yield Tensile Strength Kg/cm² MD/TD | ASTM D-882 | —/108 | —/96 |
| Break Tensile Strength Kg/cm² MD/TD | ASTM D-882 | 205/105 | 210/154 |
| Elongation % MD/TD | ASTM D-882 | 330/480 | 340/500 |
| Elmendorf Tear g/mm MD/TD | ASTM D-1922 | 3462/4635 | 3543/3937 |

While several preferred embodiments of the present invention have been disclosed herein, the teachings thereof will suggest numerous alternative embodiments and modifications to those skilled in the art.

What is claimed is:

1. An integrated commercial system for extruding a commercial end product from a polymer obtained directly from a polymerization reactor, in the absence of intermediate, energy-consuming process steps involved with the use of an intermediate product, comprising:
   (a) means for directly withdrawing substantially all of the molten polymer produced by a polymerization reactor, including transfer means for conducting said molten polymer from the polymerization reactor;
   (b) an extruder connected to said transfer means and receiving substantially all of said molten polymer withdrawn by said withdrawing means;
   (c) a film blowing extrusion die connected to said extruder for forming the extruded polymer into a tubular polymeric product so as to eliminate intermediate steps including cooling the polymer from the reactor, forming it into a suitable intermediate product, transferring the intermediate product to a processing plant and reheating and repressurizing the intermediate product to render the latter suitable for extrusion;
   (d) means for flattening said tubular product;
   (e) means for sensing the lateral dimension of the tubular product;
   (f) ventilation means for venting the interior of said tubular product to prevent undue concentrations of monomer from accumulating therein, whereby monomer dissolved in the extruded polymer which is released interiorly of said tubular product is prevented from building up to potentially explosive concentrations, said ventilation means comprising gas inlet means for introducing fresh gas into the tubular product including a first inlet passageway which is continually open during operation of the system for supplying gas into the tubular product and a second passageway communicating with said first passageway for venting fresh gas therefrom, and gas outlet means continually open during operation of the system for venting monomer-containing gas from said tubular product; and
   (g) means, responsive to said sensing means, for controlling said ventilation means to maintain the diameter of said extruded tubular product within predetermined limits, including a control valve arranged in said second passageway for regulating gas vented therethrough from said first passageway so as to control the amount of gas flowing through said gas inlet means into the tubular product.

2. An integrated system as claimed in claim 1, comprising safety pressure relief means in communication with said transfer means for limiting the pressure of the molten polymer withdrawn from the reactor to a predetermined value without rupturing said transfer means.

3. An integrated system as claimed in claim 1, said withdrawing means being positioned proximate the product extruder of the polymerization reactor.

4. An integrated system as claimed in claim 1 comprising means for heating said transfer means to maintain said polymer in its heated molten state.

5. An integrated system as claimed in claim 4, said heating means including a steam jacket encompassing said transfer means.

6. An integrated system as claimed in claim 1, comprising a vacuum pump connected to said gas outlet means to enhance the outflow of monomer-containing gas from said tubular product.

7. An integrated system as claimed in claim 1, said withdrawing means operating to withdraw molten polymer from the polymerization reactor at a continuous flow rate.

* * * * *